Nov. 19, 1940.   J. W. FORREST ET AL   2,221,916
COLOR COMPARATOR
Filed Dec. 23, 1938   2 Sheets-Sheet 1

JOHN W. FORREST
HAROLD W. STRAAT
INVENTOR
BY
ATTORNEYS

Nov. 19, 1940.   J. W. FORREST ET AL   2,221,916
COLOR COMPARATOR
Filed Dec. 23, 1938   2 Sheets-Sheet 2

JOHN W. FORREST
HAROLD W. STRAAT
INVENTOR
BY
ATTORNEYS

Patented Nov. 19, 1940

2,221,916

UNITED STATES PATENT OFFICE 2,221,916

COLOR COMPARATOR

John W. Forrest, Brighton, and Harold W. Straat, Irondequoit, N. Y., assignors to Bausch & Lomb Optical Company, Rochester, N. Y., a corporation of New York Application December 23, 1938, Serial No. 247,436

3 Claims. (Cl. 88—14)

The present invention relates to optical instruments and more particularly to optical instruments for comparing a sample with a standard color chart for determining the color of the sample in terms of the standard chart.

One of the objects of the present invention is to provide a new and improved color comparator. Another object is to provide a color comparator in which both the standard chart and the sample are simultaneously scanned. A further object is to provide an optical system for simultaneously scanning or integrating two adjacent object fields. Still another object is to provide a color comparator in which a sample and a standard are imaged in contiguous fields in the same plane and both images are simultaneously scanned or integrated. These and other objects and advantages reside in certain novel features of construction, arrangement and combination of parts as will hereinafter be more fully set forth and pointed out in the appended claims.

Referring to the drawings.

Figure 1:
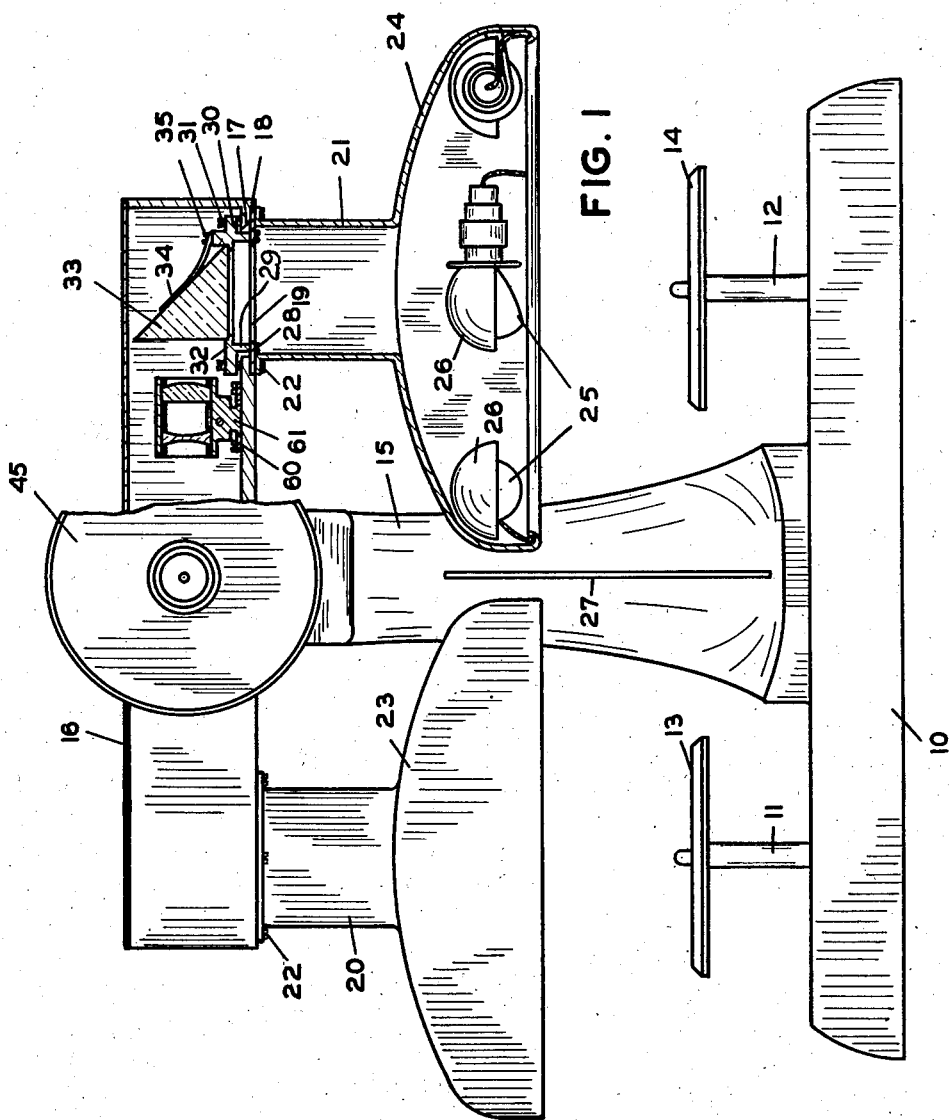
Fig. 1 is a front elevation of our improved color comparator with parts in section.
Figure 2:
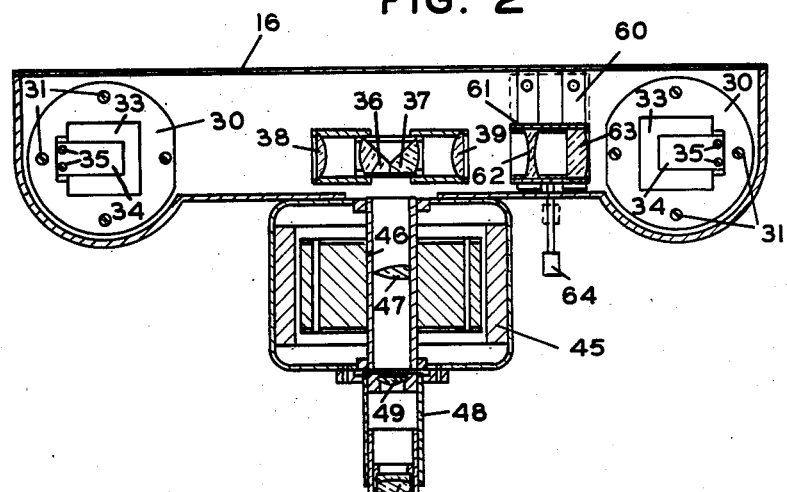
Fig. 2 is a horizontal section through the optical system of the instrument.

The present invention relates to a color comparator of the type described and claimed in U. S. Patent No. 2,054,195 issued September 15, 1936 to John W. Forrest and Gustave Fassin.

In the embodiment illustrated in the drawings, 10 designates a base upon which are mounted two spaced supports 11 and 12 carrying tables 13 and 14, respectively. A pillar 15 extends upwardly from the base 10 between, but out of alignment with the tables 13 and 14 and a horizontal tubular housing 16 is secured at the top of the pillar 15. The ends of this housing 16 extend over the tables 13 and 14 and openings 17 are formed in the bottom of the housing adjacent the ends thereof, in alignment with the tables 13 and 14.

The bottom of the housing 16 is recessed around each opening 17 as indicated at 18 to receive an annular plate 19 of resilient material. Two vertical light tubes 20 and 21 engage the plates 19 and the tubes 20 and 21 and plates 19 are secured to the housing 16 by screws or bolts 22. These light tubes 20 and 21 are concentric with the openings 17 and coaxial with the tables 13 and 14, respectively. The bottoms of these tubes 20 and 21 are flared outward above the tables 13 and 14 to form concave reflectors 23 and 24, respectively, and a plurality of light sources 25 are located within the reflectors 23 and 24. A reflector 26 is adjustably mounted on each light source 25 for selectively directing the light down on the tables 13 and 14 or up against the concave reflectors 23 and 24. These reflectors 23 and 24 are preferably painted white to provide diffuse illumination for the tables 13 and 14. A septum 27 carried by the pillar 15 prevents light from the lamps in reflector 23 from reaching the table 14 and light from the lamps in reflector 24 from reaching the table 13.

In alignment with each opening 17 is a prism mount 29 having a flange 30 which extends outward over the edge of the opening 17. Four levelling screws 31 are threaded through the flange 30 to permit each mount 29 to be adjusted so that its prism is properly positioned with respect to its table and also to the optical elements of the instrument. The top of the mount is recessed at 32 to receive a right angle prism 33, and a leaf spring 34 secured to the mount by screws or bolts 35 bears against the prism 33 to hold it in the recess 32. The lower part of each mount 29 extends down through the opening 17 and is secured to the plate 19 by screws 28, the resilient character of the plate 19 permitting it to conform to the position of the mount to form a dust shield. The two prisms 33 face each other and direct the light from the tables 13 and 14 along a common axis.

Located substantially midway between the prisms 33 and on the optical axis thereof is an optical combining system. This system consists of two rightangle prisms 36 and 37 with their hypotenuse faces at right angles and their front faces 41 and 43, respectively, lying in substantially the same plane. Between the prism 36 and the adjacent prism 33 is a lens 38 and a substantially identical lens 39 is located between the prism 37 and the adjacent prism 33. The surface 40 of the prism 36 is curved and this curved surface 40, together with the lens 38 forms an image of the table 13 in the prism face 41. The prism 37 is similarly curved at 42 to image the table 14 in the prism face 43.

In one satisfactory combining system, the lenses 38 and 39 were formed of glass having an index of 1.523 and a reciprocal relative dispersion of 58.6. The lenses 38 and 39 were plano convex with a curvature of 27.8 mm. and were spaced 37.45 mm. from the prisms 36 and 37, respectively. The prisms 36 and 37 were formed of glass having an index of 1.517 and a reciprocal relative dispersion of 64.5 and the surfaces 40 and 42 each had a curvature of 20.7 mm. Of course, the powers of these lenses may be widely varied but the above example was found convenient and inexpensive to make and the resulting images were of convenient size. The resulting images were formed substantially in the plane of the prism faces 41 and 43 and hence were substantially contiguous and coplanar.

In practice it has been found that it is frequently desirable to scan or integrate not only the standard but also the sample. Inequalities of color between various portions of the sample give uncertain results and, when the sample under examination is a granular or lumpy substance such as coffee, inequalities of shade or color due to uneven illumination are almost unavoidable. For this reason, we provide an optical system which simultaneously scans or integrates the images of both tables.

One suitable form of scanning or integrating system comprises an electric motor 45 mounted on the front wall of the housing 16. This motor has a hollow rotatable shaft 46, the axis of which is perpendicular to the plane of the faces 41 and 43 of the prisms 36 and 37. The axis of this shaft 46 passes through the line joining the two prism faces 41 and 43. A lens 47 is mounted within the shaft 46 with the prism faces 41 and 43 substantially at one focus thereof.

A tube 48 is carried by the motor 45 in axial alignment with the shaft 46 and a biprism 49 is fixed in this tube 48 at substantially the other focus of the lens 47. This biprism 49 is positioned so that its edge is parallel to the line joining the two prism surfaces 41 and 43. The biprism 49 is of such power that the rays from the centers of the images of the tables 13 and 14 are deflected and made parallel to the common axis of the shaft 46 and tube 48.

A second tube 50 is telescopically mounted in the tube 48. This tube 50 carries a lens 51 and the tube 50 is adjusted until the biprism 49 is located at the focus of the lens 51. A small eyepiece diaphragm 52 is located at the other focus of the lens 51 and, if desired, a suitable filter 52' can be placed at this diaphragm. Thus the lens 47 reimages the two tables 13 and 14 at infinity, the biprism alters the direction of the light beams in such manner that the lens 51 forms the images in superposition at the diaphragm 52. Looking into the diaphragm, the observer does not see a focused image but sees two contiguous illuminated fields.

Figure 3:
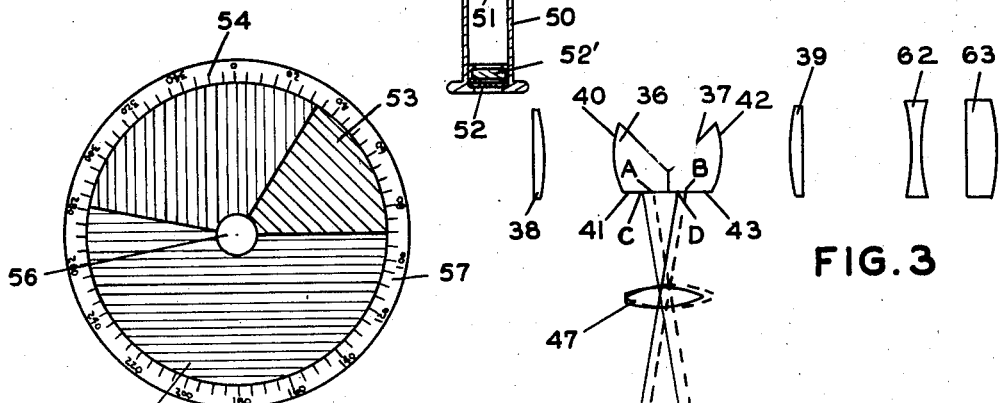
Fig. 3 is a diagrammatic showing of the optical system.
Figure 4:
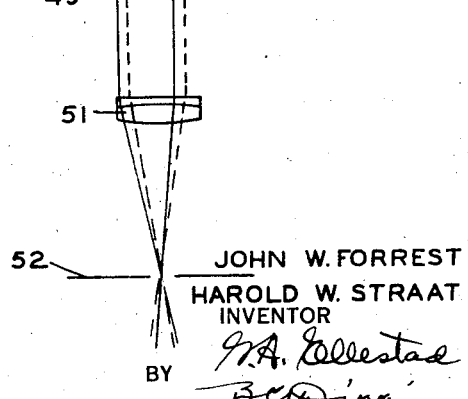
Fig. 4 is a top plan view of a typical standard color chart.

The operation of this optical scanning or integrating system can be best understood from Fig. 3 of the accompanying drawings. If the lens 47 were centered relative to the axis of the system, as shown in dotted lines, the centers A, B of the two images would be reimaged at the diaphragm 52 and rotation of the lens 47 would have no effect. However, when the lens 47 is decentered as shown in full lines in Fig. 3, points C, D of the two images will be reimaged at the diaphragm 52. These points C, D are spaced from the center points A, B and rotation of the lens 47 about the optical axis of the system will cause a scanning or integrating of the images. The amount of decentration of the lens 47 is variable within rather wide limits. The greater the amount of decentration, the greater will be the distance between the center of the image and the point reimaged at the diaphragm. The maximum decentration is thus limited by the size of the image. The minimum decentration is limited by the mechanical construction of a standard color chart as will be hereafter described.

In one suitable scanning or integrating system, the lens 47 is an equi-convex lens of glass of an index of 1.523 and a reciprocal relative dispersion of 58.6 having a curvature of 52.7 mm. This lens is spaced 50 mm. from the prism surfaces 41 and 43. The lens 47 is 2.5 mm. off center. The biprism is formed of glass of an index of 1.517 and a reciprocal relative dispersion of 64.5 and its prism angle is 8° 37' 10". This biprism 49 is placed 50 mm. in front of the lens 47. The lens 51 may be a two inch achromat and is located 50 mm. in front of the biprism 49. One suitable achromat comprises a plano concave lens of glass of an index of 1.649 and a reciprocal relative dispersion of 33.8. The concave surface has a radius of 42 mm. The positive lens component of the achromat is of glass of an index of 1.523 and a reciprocal relative dispersion of 58.6. The free surface of this positive lens has a curvature of 25.8 mm. The diaphragm 52 is spaced 50 mm. from the achromat 51 and is preferably small. An opening of 1.9 mm. is adequate.

The standard color chart may consist of a plurality of disks 53, 54 and 55 arranged in overlapping relation on the table 13. These disks are of different hue, saturation or brightness and are secured on the table 13 by a suitable nut 56. The decentration of the lens 47 must therefore be sufficient to displace the image of the disks by an amount equal to the radius of the nut 56 plus the radius of the image of the eye opening in the diaphragm 52 as projected backwardly through the optical systems of the instrument onto the standard or the sample table. An angular scale 57 around the disks 53, 54 and 55 provides a ready means for determining the amounts of each color present.

In operation, the motor 45 is actuated at a suitable speed rotating the lens 47 and the shaft 46 about the axis of the shaft 46. This causes the images formed by the lens 47 to move and, when the speed of rotation is sufficiently great, the images are integrated so that each field appears to be of uniform color.

It may be necessary or desirable to observe a sample which is smaller than usual and is smaller than the scanned or integrated circle. In this event, it would be necessary to change the radius of the scanned circle. In order to accomplish this change, a horizontal transverse track 60 is secured within the casing 16. A lens mount 61 is slidably mounted on this track and carries an equi-concave lens 62 and a plano convex lens 63. The surfaces of the lens 62 have a curvature of 26.15 mm. and the lens 63 has a curvature of 33.6. Both lenses are formed of glass of an index of 1.523 and a reciprocal relative dispersion of 58.6. The lenses 62 and 63 are separated in the mount 61 by 48.0 mm. These lenses 62 and 63 may be moved into or out of the optical axis by a handle 64 and, when they are in the optical axis, the lens 62 is spaced about 8.0 mm. from the lens 39. The lenses 62 and 63 combine with the lens 39 and surface 42 to form an objective of longer focal length than the lens system 39 and 42 alone. The conjugate focal planes of the new objective system are the same as those of lens 39 and surface 42, that is, at the table 14 and at the surface 43. Thus, the lenses 62 and 63 change the size of the scanned or integrated circle without affecting the position of the image.

From the foregoing, it will be apparent that we are able to attain the objects of our invention and provide a color comparator in which both a sample and a standard are simultaneously integrated or scanned. While the invention is described with reference to a standard color chart, obviously two samples could be placed on the tables 13 and 14 and compared. Various modifications can, of course, be made without departing from the spirit of our invention or the scope of the appended claims.

We claim:

1. In a color comparator for comparing a sample with a standard, the combination of an optical system for forming images of said sample and standard in contiguous fields substantially in a common plane with a second optical system for viewing and simultaneously scanning both of said fields, said second optical system being positioned in front of said fields with its optical axis perpendicularly and centrally located with respect to said fields and comprising a decentered lens element on said axis adjacent said fields for imaging the fields at infinity and for scanning the fields, said element being rotatably mounted on said axis for rotation at a speed sufficient to integrate both of the fields, driving means connected to said element for rotating it at integrating speed, a biprism spaced along said axis in front of said element and in operative relation thereto for altering the direction of the light beams from the fields and for bringing the beams into substantial parallelism, a diaphragm for viewing said fields located on said axis in front of said biprism, and a collective lens located on said axis between the biprism and the diaphragm for receiving the beams passing through the biprism and for forming images of said fields at said diaphragm.

2. A color comparator for comparing a sample with a standard, comprising an optical system for forming images of said sample and standard in contiguous fields substantially in a common plane, movable optical means selectively insertable within said system for varying the size of one of said images, and a second optical system for viewing and simultaneously scanning both of said images, said second optical system being positioned in front of said fields with its optical axis perpendicularly and centrally located with respect to said fields and having a decentered lens element on said axis adjacent said fields for imaging the fields at infinity and for scanning the fields, said element being rotatably mounted on said axis for rotation at a speed sufficient to integrate both of the fields, driving means connected to said element for rotating it at integrating speed, a biprism spaced along said axis in front of said element and in operative relation thereto for altering the direction of the light beams from the fields and for bringing the beams into substantial parallelism, a diaphragm for viewing said fields located on said axis in front of said biprism, and a collective lens located on said axis between the biprism and the diaphragm for receiving the beams passing through the biprism and for forming images of said fields at said diaphragm.

3. A color comparator for comparing a sample with a standard, comprising means for forming images of said sample and said standard in substantially contiguous fields in substantially the same plane, a decentered objective lens rotatable about an axis which passes through its mechanical center and which is perpendicular to the plane of the fields and which bisects a line joining the centers of said fields, said objective lens being positioned in front of said fields and spaced therefrom by a distance substantially equal to its focal length, a biprism spaced from said objective lens by a distance equal to the focal length of the objective lens and positioned so that said axis passes through the center of the dividing edge of said prism, said prism being also positioned so that its dividing edge is at right angles to a line joining the centers of said fields, a collective lens axially spaced from the biprism by a distance equal to its focal length and positioned so that said axis passes through its optical center, a diaphragm axially spaced from the collective lens by a distance equal to the focal length of the collective lens and positioned so that said axis passes through the center of the diaphragm and means for rotating said objective lens at a speed sufficient to integrate both of said images.

JOHN W. FORREST.
HAROLD W. STRAAT.